United States Patent [19]

Gutman

[11] Patent Number: 4,678,872
[45] Date of Patent: Jul. 7, 1987

[54] BUTTON SET AND SWITCH

[75] Inventor: Robert F. Gutman, Detroit, Mich.

[73] Assignee: United Techologies Automotive, Inc., Dearborn, Mich.

[21] Appl. No.: 905,604

[22] Filed: Sep. 10, 1986

[51] Int. Cl.⁴ .............................................. H01H 9/00
[52] U.S. Cl. ................................ 200/5 R; 200/52 R; 200/329
[58] Field of Search ............ 200/5 R, 5 A, 6 R, 52 R, 200/159 B, 329, 339, 340

[56] References Cited

U.S. PATENT DOCUMENTS

| | | | |
|---|---|---|---|
| 3,996,428 | 12/1976 | Buan et al. | 200/5 A |
| 4,029,916 | 6/1977 | Chu | 200/5 A |
| 4,032,729 | 6/1977 | Koistinen | 200/5 A |
| 4,128,744 | 12/1978 | Seeger | 200/5 A |
| 4,160,886 | 7/1979 | Wright et al. | 200/5 A |
| 4,190,748 | 2/1980 | Langford | 200/5 A |
| 4,315,114 | 2/1982 | Monti, Jr. | 200/5 A |
| 4,323,740 | 4/1982 | Balash | 200/5 A |
| 4,473,724 | 9/1984 | Suzuki | 200/6 R X |

Primary Examiner—J. R. Scott
Attorney, Agent, or Firm—Robert P. Hayter

[57] ABSTRACT

A button set and switch particularly useful for an automotive power seat switch are disclosed. The button set is a single one-piece, molded set of buttons each connecting by living hinge to a frame such that each button may be displaced independently but are physically arranged to simulate a preselected design. A printed circuit board may be mounted to the button set and may include a series a clicket switches appropriately positioned to be engaged by each botton for providing appropriate signals to obtain the desired output controlled by the switch.

13 Claims, 5 Drawing Figures

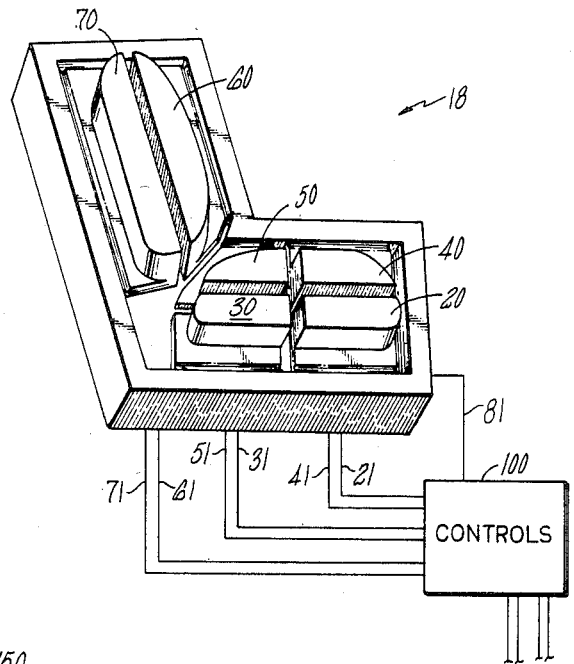
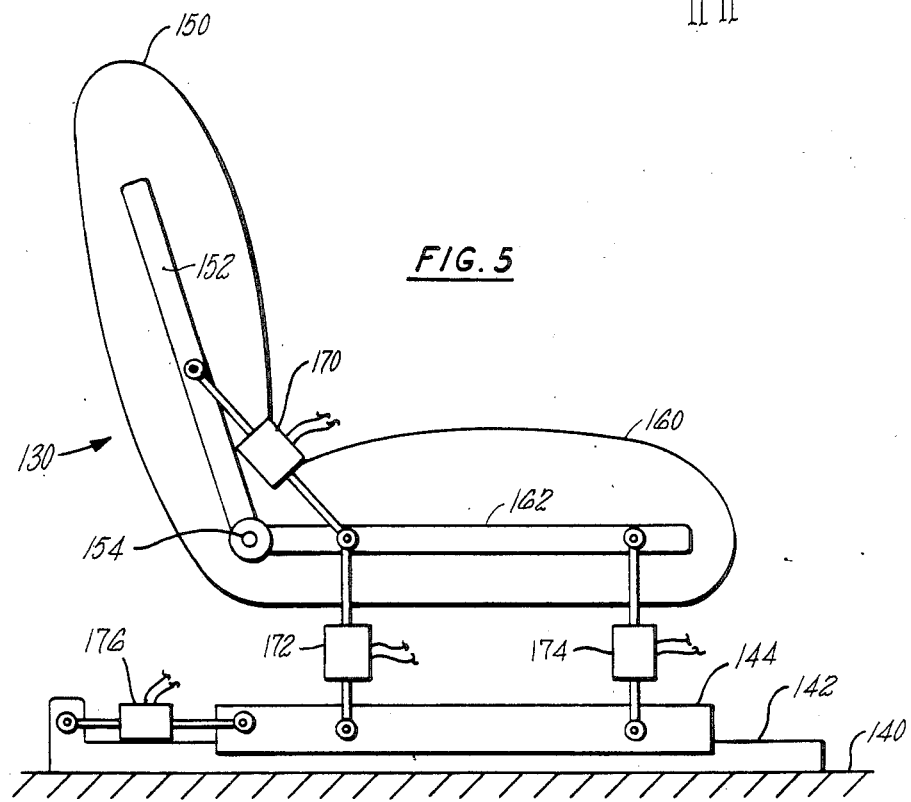

BUTTON SET AND SWITCH

DESCRIPTION

1. Cross Reference to Related Application

The subject matter of this application is related to the subject matter of commonly-owned U.S. patent application Ser. No. 905,611 filed on even date herewith and bearing the title of "Button Set".

2. Background Art

This invention relates to a button set useful for providing a series of signals for controlling functions of an electrical device. More specifically, the herein invention is directed to a one piece molded button set utilized to control power seat motion in a motor vehicle. The button set is designed to have a series of individual buttons arranged to simulate the appearance of an automotive seat including the seat back and seat bench.

It has become desirable to provide power seats in motor vehicles. The power seat typically has appropriate motors for controlling the lowering and raising of both the front and back ends of the seat bench and the translation of the entire seat fore and aft in the vehicle. Additionally, means are provided for moving the seat back, fore and aft to change the relative inclination between the seat back and the seat bench.

At least one motor vehicle manufacturer currently sells an automobile having a power seat system including seat switches which are located on each front door. The switch includes a knob designed to simulate the seat bench and separate knob designed to simulate the seat back. These knobs are manually displaced in a manner to emulate the desired seat displacement to adjust the seat to the desired position. This particular switch referenced allows for sliding displacement of the knob in the direction it is desired to have the seat be displaced.

The herein invention is directed to a one piece molded button set wherein a plurality of buttons are connected by living hinges to a frame means. Each button is positioned relative to a printed circuit board having an appropriate switch mechanism such as clickets and contacts, such that a very small downward displacement of the button makes an electrical contact which is utilized to control seat position.

The button set has a seat cushion profile defined by the plurality of buttons. The backrest is, for instance, divided into two buttons one of which may be actuated to have the backrest move forward and one to have the backrest move backward. In like manner the seat bench is divided into quadrants. By pushing one of the buttons, an appropriate up or down, motion of the front end or back end of the seat bench is accomplished. By pressing two buttons simultaneously, either the entire seat bench moves up or down or fore or aft. By dividing the seat button set in this manner the user may readily determine by sight or feel which button to depress to obtain the desired motion.

The use of living hinges wherein the button, the frame and the hinge connecting the button to the frame are all a portion of the same material formed from an integrally molded part having no separate pieces which may rattle or contact each other to make undesirable noise. Additionally, by all the buttons being integrally molded in one piece, proper alignment among the buttons is assured. Additionally, the number of separate pieces received for the entire assembly is reduced and the assembly operation is made simpler and less costly.

In addition to the above, the button set is ergonomically shaped for easy recognition either visually or by feel. The low button travel promotes hinge life and provides tactile feed-back giving a "high tech" feel to the operator. Utilization of parallel switch closures on the seat switch provides a neat, clean uncluttered button orientation and appearance. Six total switches provide for more that six functions by the use of appropriate control to read the appropriate combination of switches to determine the desired seat operation.

DISCLOSURE OF INVENTION

An object of the present invention is to provide an improved switch assembly.

A further object of the invention is to provide a one piece button set useful for actuating a switch means.

A still further object of the present invention is to provide an automotive power seat switch which is relatively quiet.

It is a yet further object of the present invention to provide a button set incorporating living hinges such that the button set hinges and frame for supporting the buttons are all formed integrally to provide for ease of assembly and to assure appropriate alignment.

It is a still further object of the present invention to provide a power seat switch incorporating a button set having ergonomically shaped buttons for easy recognition.

It is still another object of the present invention to provide a button set and switch combination having a short button travel with tactile feedback to promote long hinge life and a high tech feel in switching.

It is a still further object of the present invention to provide a safe, economical, reliable easy to assemble and ergonomically satisfactory button set.

It is yet another object of the present invention to provide a safe, economical, reliable, easy to manufacture and assemble, and ergonomically satisfactory power seat switch.

Other objects will be apparent from the description to follow and the appended claims.

The above objects are achieved according to a preferred embodiment of the invention by the provision of a switch including a one piece molded button set having a series of buttons each connected by hinge means to a frame means such that each button may be displaced independently, such buttons being arranged in a pattern to simulate a preselected design and each button including an actuator portion. A circuit means is mounted to the button set and includes a series of switch means positioned to be engaged by the actuator portion of each button for providing a signal indicating that the button is displaced. A printed circuit board may be mounted to the one piece button set and may include clickets, switches and contacts mounted thereto to provide a signal upon displacement of the individual buttons.

Also disclosed is a one piece button set for actuating a switch means which includes a frame means, a series of buttons, a living hinge connecting each button to the frame means for allowing the buttons to be appropriately displaced, and an actuator portion of each button located appropriately to be able to engage switch means to be actuated.

BRIEF DESCRIPTION OF THE DRAWINGS

FIG. 4 is a partially perspective, partially schematic diagram indicating the appropriate electrical connections from the power seat switch to a control device.

FIG. 5 is a schematic representation of a power seat system to be actuated by the appropriate controls.

BEST MODE FOR CARRYING OUT THE INVENTION

The invention herein will be described with reference to controlling a power seat in a motor vehicle application. It is to be understood that the switch as claimed may have application to any end use and the use of this switch as a power seat switch for a motor vehicle is but one of many potential uses. In like manner, the claimed button set although described as a button set for a motor vehicle may be used in other applications. Additionally, although the button set is described as being an intregal single piece, molded button set, it is obvious that combinations of two or three pieces each having multiple buttons would accomplish the same function. Additionally, whether or not the frame means from which the buttons are mounted is circumferential or not does not appear to be critical as long as the buttons are all secured to a fixed frame which maintains the relative postioning of the buttons.

Figure 1:
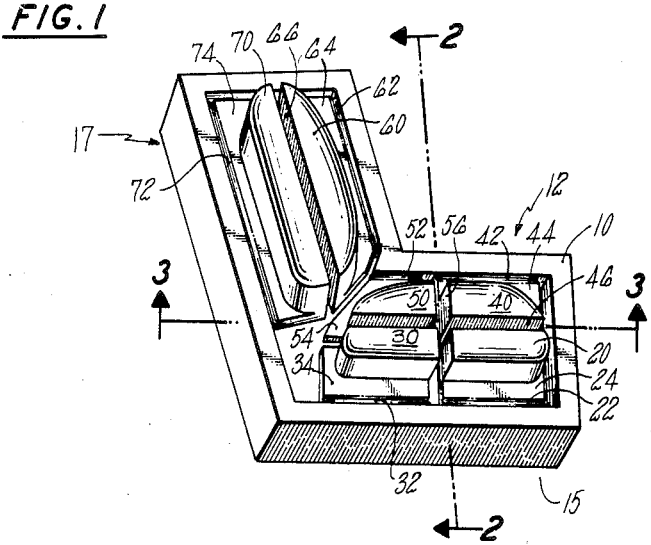
FIG. 1 is a perspective view of a button set utilized in a power seat switch.

Referring first to FIG. 1, there may be seen a button set 12. Frame 10 is generally "L" shaped and extends circumferentially about button set 12. Vertical portion 17 extends upwardly and horizontal portion 15 extends horizontally. The button set is broken up into a series of individual buttons for selecting appropriate seat motion. The seat bench portion is broken up into a forward down button 20 connected by connecting portion 24 to living hinge 22 to frame 10. In like manner, rearward down button 30 is connected by connecting portion 34 to living hinge 32 to frame 10. Forward up button 40 is connected by connecting portion 44 to living hinge 42 to frame 10. Rearward up button 50 is connected by connecting portion 54 to living hinge 52 to frame 10.

Likewise, the seat back includes a seat back rearward button 70 connected by connecting portion 74 to living hinge 72 to frame 10. Seat back forward button 60 connected by connecting portion 64 to living hinge 62 to frame 10.

Seat back forward button 60 and seat back rearward button 70 define therebetween seat back divider space 66. This space is provided such that an operator may manually feel the distinct buttons by detecting the space such that the forward and rearward buttons may be easily detected and depressed and also to provide actuation clearance. In like manner, rearward up button 50, forward up button 40, forward down button 20, and rearward down button 30 each define quadrants of the seat bench such that there is a seat bench horizontal divider space 46 and a seat bench vertical divider space 56 separating the seat bench into quadrants also for allowing the operator to easily detect the four separate buttons and also to provide actuation clearance.

Figure 2:
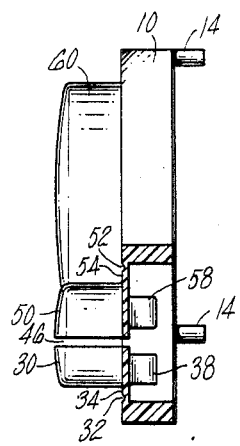
FIG. 2 is a sectioned view taken at line II—II in FIG. 1.

FIG. 2 is a sectionaly view of FIG. 1 taken at line II—II. Therein it may be seen that rearward down button 30 and rearward up button 50 extend upwardly beyond frame 10 and include pins 38 and 58 respectively, extending in a downward manner within frame 10. Seat back forward button 60 is additionally shown as is frame 10. Heatstakes 14 formed as a portion of the frame extend downwardly from the main portion of the frame are also shown.

Figure 3:
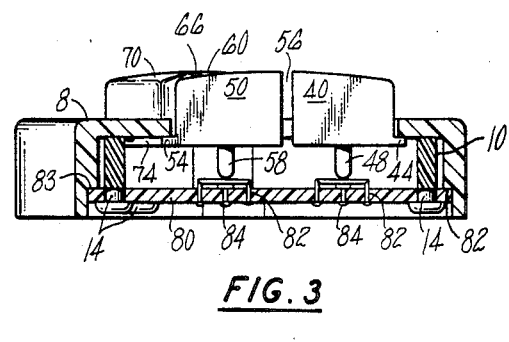
FIG. 3 is a sectional view taken at line III—III in FIG. 1 and wherein the button set includes a printed circuit board mounted thereto.

Referring to FIG. 3 which is a sectional view of FIG. 1 taken at line III—III, it may be seen that forward up button 40 and rearward up button 50 each include respectively pins 58 and 48 extending downwardly therefrom. It may also be seen that frame 10 extends circumferentially about the button set and includes heatstakes 14 extending downwardly therefrom. Trim bezel 8 is shown mounted about the frame and covering the living hinge and connecting portions of the button set. The seat back downward button 70 may additionally be seen.

Also shown in FIG. 3, although not necessarily included in FIG. 1, is printed circuit board 80 which extends horizontally below the butron set and engages printed circuit board ledge 83 defined by trim bezel 8. Heatstakes 14 are designed to extend downwardly through appropriate openings in the printed circuit board. The heads of the heatstakes may be melted to securely affix the printed circuit board to the frame including to printed circuit board ledge 83.

Mounted to the printed circuit board are clickets 82, which are spring type elements which are capable of contacting contacts 84 to make a circuit therebetween. Pins 58 and 48 extending downwardly from buttons 50 and 40 are aligned such that displacement of the button 50 downwardly allows pin 58 to displace clicket 82 downwardly to engage contact 84. The total displacement required to effect contact may be in the order of only twenty thousandths of an inch.

Clickets are spring type members such that the clicket urges the button upwardly to disengage the clicket from the contact upon release of the button. The living hinge has some natural resilience which likewise acts to urge the button to its at rest position. In like manner, six clicket switches mounted all to the same circuit board may be provided under the six buttons as shown in FIG. 1. Hence, displacement downwardly of any of the six buttons creates the appropriate signal by making contact between the clicket and contact associated therewith.

Referring now to FIG. 4 there may be seen a like representation of switch 18 including the button set and showing buttons 20, 30, 40, 50, 60 and 70. Individual conductor runs on a printed circuit board or wires or other contacts are shown as wires 21, 31, 41, 51, 61, 71 and 81. These various wires connect switch 18 shown in its entirety to controls 100. Wire 81 is a power wire feeding each switch element. Upon actuation of the switch, the contact is closed, moving the seat. Controls 100, typically a microprocessor control although a standard relay control would suffice, act to decipher the inputs from the individual buttons to switch 18 and to provide appropriate outputs to energize the appropriate motors of the power seat.

The controls 100 act upon seat back forward button 60 being downwardly displaced to receive a signal on wire 61 and to aporopriately energize motor 170 to displace the seat back in the forward direction. In like manner, upon seat back rearward button 70 being downwardly depressed wire 71 carries a signal to controls 100 and motor 170 is operated in the reverse direction to cause the seat back to be displaced in a rearward direction.

Upon any of the four buttons emulating the seat bench being depressed then the appropriate wire is energized and the controls act to cause the seat bench to be raised or lowered. If both forward up button 40 and rearward up button 50 are depressed, the entire seat moves upwardly. If both rearward down button 30 and forward down button 20 are depressed, the entire seat moves downwardly. To have the entire seat move forward, both forward down button 20 and forward up button 40 are depressed. In such a case, the controls interpret that signal to require that the entire seat be displaced forwardly. In like manner, if both rearward down button 30 and rearward up button 50 are depressed, the entire seat moves to the rear. Hence, the controls interpret the combination of outputs from the various buttons to obtain the desired seat motion. The controls may have a built-in delay factor before energizing a motor to allow appropriate time for the desired combination of buttons to be depressed.

FIG. 5 is a schematic view of a typical seat assembly. This view is not intended to represent any specific system but merely to show the appropriate components and interconnections. Seat 130 is shown having seat back 150 pivotally connected by pivot 154 to seat base 160. Support member 152 runs through seat back 150 and is connected at pivot connection 154 to support member 162 through base 160. The automobile is reflected as car base 140 which has extending upwardly therefrom track 142 on which sliding member 144 is mounted. Motor 176, the forward-aft motor, is connected within the car base and sliding member 144. Forward operation of motor 176 causes seat 130 to be displaced to the right or in a forward direction. Reverse operation of the motor causes the seat to be displaced to the left or in an aft direction. Aft height motor 172 is shown connected between support member 162 and sliding member 144 at the back portion of the seat base. This motor can be operated in either direction to either raise or lower the back portion of seat base 160. Similarly, front height motor 174 is located between sliding member 144 and support member 162 towards the front end of seat base 160. This motor is also bi-directional and may be operated to either raise or lower the front end of seat base 160.

Seat back motor 170 is connected between support member 162 and support member 152. This motor may be operated in either direction to either raise or lower the seat back relative to the seat bench. Since the seat back is pivotally connected to the seat bench, operation of this motor acts to change the angle of inclination between the seat back and the seat bench.

The herein described seat switch is described relative to a power seat for use in a motor vehicle. It is understood that this switch may be used for other applications including non-automotive applications.

The invention has been described with reference to a particular embodiment. It is to be understood by those skilled in the art that variations and modifications can be effected within the spirit and scope of the invention.

I claim:

1. A switch comprising:
    a one-piece molded button set having a series of buttons each connected by a hinge means integral to a frame means extending about the perimeter of the button set such that each button extends inwardly from the frame means and each button may be displaced independently, said buttons being arranged in a pattern to emulate a seat back and a seat bench of an automobile power seat and each button including an actuator portion; and
    a circuit means mounted to the button set and including a series of switch means positioned to be engaged by the actuator portion of each button for providing a signal indicating that a button was displaced and that the operator desires the seat back or seat bench to be displaced in accordance with the particular button displaced.

2. The apparatus as set forth in claim 1 wherein the hinge means comprises living hinges formed integrally with each of the buttons and the frame means and wherein the frame means is generally "L" shaped and wherein the button set includes a pair of buttons extending into a vertical portion of the "L" shape to emulate the seat back, one button for effecting another of the seat back in a forward direction and one button for effecting motion of the seat back in a rearward direction.

3. The apparatus as set forth in claim 2 wherein the circuit means comprises a printed circuit board having switch means mounted thereto.

4. The apparatus as set forth in claim 3 wherein the button set further comprises heatstakes extending from the frame means, and said printed circuit board having openings through which said heatstakes may extend, said heatstakes being melted after assembly to form an enlarged portion for securing the printed circuit board to the button set.

5. The apparatus as set forth in claim 4 wherein the frame means further comprises a printed circuit board ledge for receiving and positioning the printed circuit board.

6. The apparatus as set forth in claim 3 wherein the switch means comprises clickets and contacts mounted to the printed circuit board, said clickets being positioned to be engaged by the actuator portion of the appropriate button.

7. The apparatus as set forth in claim 1 wherein the button set further comprises four buttons positioned to emulate the seat bench of an automotive power seat, one button for effecting upward movement of the from of the seat bench, one button for effecting downward movement of the front of the seat bench, one button for effecting upward movement of the rear of the seat bench and one button for effecting downward movement of the rear of the seat bench.

8. The apparatus set forth in claim 7 and further comprising the frame means being generally "L" shaped and wherein the seat back buttons are connected by the hinge means to the vertical portion of the "L" and the seat bench portions are connected to the horizontal portion of the "L".

9. The apparatus as set forth in claim 8 and further comprising the four seat bench buttons being positioned to define a vertical divider space and a horizontal divider space such that each button represents one quadrant of the seat bench.

10. A one-piece button set for actuating a switch means which comprises:
    a frame means defining a generally "L" shaped perimeter of the button set and including extending heatstakes for use in securing the switch means to the button set;

a series of buttons extending inwardly from the frame means;

a living hinge connecting each button to the frame means for allowing the buttons to be appropriately displaced; and an actuator portion of each button located appropriately to contact the switch means to be actuated; and wherein said buttons are configured within the "L" shaped frame to emulate an automotive seat back and seat bench, each emulated seat back and seat bench being subdivided such that appropriate buttons to select the desired displacement of the seat back or seat bench collectively emulate the seat back or seat bench while allowing independent operation of each button to select the desired displacement.

11. The apparatus as set forth in claim 10 which further comprises the buttons being arranged to emulate a seat back including two separate buttons being arranged to simulate the seat back, one button for each direction of desired seat back motion.

12. The apparatus as set forth in claim 10 which further comprises the buttons being arranged to emulate a seat bench including four separate buttons being arranged, one as each quadrant of the seat bench.

13. The apparatus as set forth in claim 12 wherein the four separate buttons arranged to emulate a seat bench define both a horizontal dividing space and a vertical dividing space therebetween.

* * * * *

UNITED STATES PATENT AND TRADEMARK OFFICE
CERTIFICATE OF CORRECTION

PATENT NO. : 4,678,872

DATED : July 7, 1987

INVENTOR(S) : Robert F. Gutman

It is certified that error appears in the above-identified patent and that said Letters Patent is hereby corrected as shown below:

Column 3, line 34: before "of the" change "postioning" to "positioning".

Column 4, line 1: before "view" change "sectionaly" to "sectional".

Column 4, line 23: after "the" change "butron" to "button".

Column 4, line 66: after "and to" change "aporopriately" to "appropriately".

Column 6, line 46: after "of the" change "from" to "front".

Signed and Sealed this

Twenty-second Day of December, 1987

Attest:

DONALD J. QUIGG

*Attesting Officer*  *Commissioner of Patents and Trademarks*